United States Patent [19]

Kuchuk-Yatsenko et al.

[11] 4,208,569
[45] Jun. 17, 1980

[54] DEVICE FOR CONTROLLING THE PROCESS OF FLASH-BUTT WELDING

[76] Inventors: Sergei I. Kuchuk-Yatsenko, ulitsa Filatova 1/22, kv. 47; Valery G. Krivenko, ulitsa Ordzhonikidze, 3, kv. 35; Nikolai V. Podola, ulitsa Pushkinskaya, 8, kv. 12; Vadim P. Krivonos, ulitsa Krasnoarmeiskaya, 45, kv.; Boris L. G. Chev, Novo-Gostomelskoe shosse, 5, kv., all of Kiev, U.S.S.R.

[21] Appl. No.: 943,216

[22] Filed: Sep. 18, 1978

Related U.S. Application Data

[60] Division of Ser. No. 792,305, Apr. 29, 1977, abandoned, which is a continuation-in-part of Ser. No. 775,930, Mar. 9, 1977, abandoned, which is a continuation of Ser. No. 547,874, Feb. 6, 1975, abandoned.

[51] Int. Cl.$^2$ ............................................. B23K 11/04
[52] U.S. Cl. ..................................................... 219/97
[58] Field of Search .................... 219/97, 100, 101; 318/562, 609

[56] References Cited

U.S. PATENT DOCUMENTS

3,335,257  8/1967  Sakharnov et al. .................. 219/101
3,555,237  1/1971  Riley .................................... 219/100

Primary Examiner—B. A. Reynolds
Assistant Examiner—Clifford C. Shaw
Attorney, Agent, or Firm—Haseltine, Lake & Waters

[57] ABSTRACT

The invention relates to a device for welding workpieces that have a large cross-sectional area, as well as for cases of high welding power requirements. The device in accordance with the invention comprises a mechanism for continuously displacing the workpieces being welded with a controlled drive, a mechanism for imparting to the workpieces additional reciprocating motion, a welding transformer, and a means for controlling the speed of the drive. The drive speed control means includes a welding-current pulse shaper coupled to the output of a current transformer, the latter being included in the primary circuit of the welding transformer and a welding-current pulse-length setter. The latter and the output of the pulse shaper are coupled to a comparator, the output whereof is coupled to the drive control circuit. In the course of flasing of the butt ends of the workpieces being welded, the welding-current pulse length is measured during each reciprocation period, and, depending on the error signal furnished by the comparator, the speed of continuous displacement of the workpieces being welded is adjusted.

4 Claims, 14 Drawing Figures

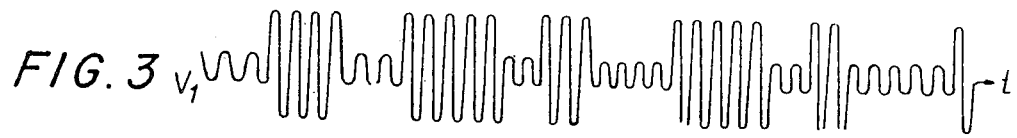
FIG. 3 $V_1$
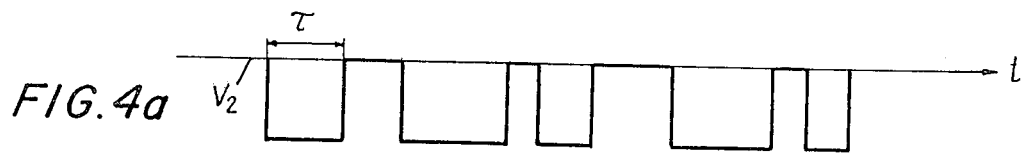
FIG. 4a $V_2$
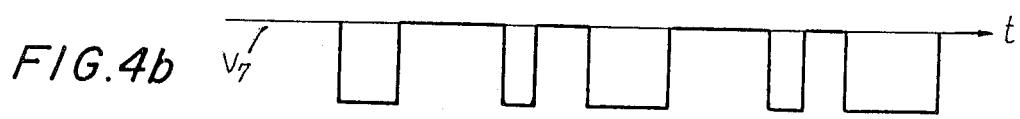
FIG. 4b $V_7$
FIG. 7a $V_3$
FIG. 7b $V_4$
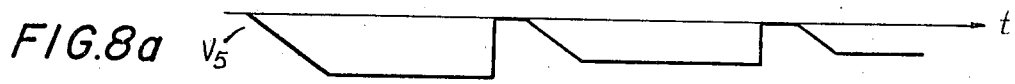
FIG. 8a $V_5$
FIG. 8b $V_6$
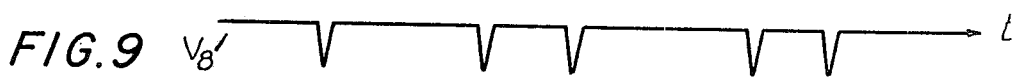
FIG. 9 $V_8$
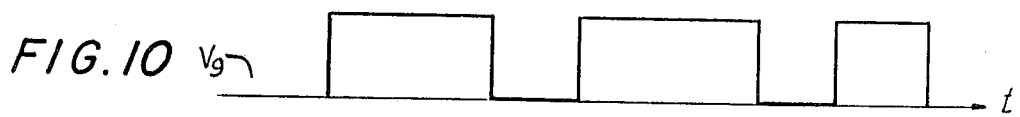
FIG. 10 $V_9$
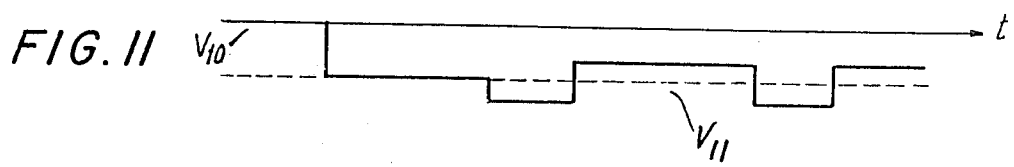
FIG. 11 $V_{10}$ $V_{11}$

DEVICE FOR CONTROLLING THE PROCESS OF FLASH-BUTT WELDING

This is a division of application Ser. No. 792,305, filed Apr. 29, 1977, now abandoned, which is a Continuation-In-Part of application Ser. No. 775,930, filed Mar. 9, 1977, now abandoned, which is a continuation of application Ser. No. 547,874, filed Feb. 6, 1975, now abandoned.

The present invention relates to electric welding, and, more particularly, to a device for controlling the process of flash-butt welding.

The invention may be advantageously employed wherever continuous flash welding is used, particularly for welding workpieces having a large cross-sectional area, as well as in cases of high welding-power requirements.

It is known in the art to employ flash-welding whereby the workpieces to be welded together, while carrying current, are continuously displaced one toward the other, generally one workpiece being moved toward the other.

Such prior art involves displacing the workpieces toward each other either at a constant or a progressively rising speed.

As the workpieces are brought together, they come into contact with each other at individual points rather than over the entire surfaces defined by the butt ends thereof. The resultant points of contact exhibit a relatively high electric resistance so that, as welding current passes therethrough, these contacts are rapidly overheated and destroyed, with part of the molten metal left on the end surfaces of the workpieces, and part of the molten metal being lost in sparks which waste part of the energy expended to heat the butt ends of the workpieces being welded. One disadvantage of these prior-art techniques consists in that a substantial portion of the welding energy input is wasted for the overheating and destruction of the numerous contacts arising between the butt ends of the workpieces being welded, with the result that metal is intensively melted and lost from the butt ends being flash-welded, calling for excessive flashing allowances.

Furthermore, with a large portion of energy wasted, the ends of the workpieces to be welded cannot be heated to a sufficient depth, rendering these prior-art methods inapplicable for the welding of workpieces having a large cross-sectional area, which can be welded only provided their ends are sufficiently heated to a considerable depth.

Recently, workpieces of a large cross-sectional area have been widely welded by a known flash-welding technique, whereby, apart from continuously displacing the workpieces one toward the other, one of the workpieces is additionally given a reciprocating motion in a direction coinciding with the direction of continuous displacement of the workpieces. According to the latter method, the speed of displacement of the workpieces being welded rises over a specified time interval and then drops or even reverses over an identical time interval.

As a result, welding current flows in the form of current pulses with further attenuation thereof to a possible break of the welding circuit. These pulses recur at the frequency of the additional reciprocating movements imparted to one of the workpieces, each welding-current pulse comprising several supply-voltage periods, and each period may display sharp current fluctuations at a frequency of the order of several hundred Hertz, due to the overheating and destruction of the multiple small contacts on the butt ends of the workpieces being welded.

Flash-welding according to the latter approach is effected with the use of butt-welding machines equipped with a welding transformer, a mechanism for continuously displacing the workpieces being welded one toward the other, and a mechanism for imparting additional reciprocating motion to the workpieces.

The latter two types of mechanisms exist in a range of various designs. Thus, one of the workpieces being welded may be continuously moved toward the other, the latter reciprocating in a direction coinciding with the direction of continuous displacement. Alternatively, the same workpiece is continuously displaced toward the other and is given an additional reciprocating motion. In both cases, the frequency and amplitude of the additional reciprocating movements are preset within narrow limits and can be neither varied nor monitored in the course of welding.

Such butt-welding is conducive to a much higher welding-current density and a lower average speed of displacement of the workpieces being welded, one toward the other, resulting in a shorter welding time and a considerable amount of metal lost in flashing.

However, as the temperature of the butt ends of the workpieces being welded rises so does the flash-off intensity, with the result that the contacts formed between the butt ends take less time to get overheated and destroyed than in case of cold butt ends. Hence there are higher metal losses in sparks, higher energy loses, and a corresponding reduction in the amount of energy available for heating the workpieces. The latter circumstances necessitate longer welding times and higher flashing allowances.

The flash-off intensity increase that accompanies the rise of the butt-end temperature is not strictly time-dependent and, hence, cannot be allowed for in advance. The factors affecting the intensity of flashing are as follows: changes in the welding voltage, changes in the amplitude of additional reciprocating displacements, caused by variations in pressure and viscosity of oil in the hydrosystem.

It is an object of the present invention to intensify heating.

It is another object of the present invention to provide for the reproducibility of welding conditions in multirun welding.

It is a further object of the present invention to improve the quality of the welded joints.

Other objects of the present invention include, inter alia, achieving a higher rate of flash welding.

There are systems in use for the automatic control of flash-butt welding processes. Some of them comprise a transducer of the welding flashing current in a feedback loop that actuates the speed of the workpiece motion. The transducer in such a system transfers the amplitude of the continuous flashing AC into a corresponding level of a constant voltage, as was disclosed in U.S. Pat. No. 3,748,431 to Melbard et al. The disadvantage of such systems is, especially in case of flash-butt welding of large cross-section work pieces, that the welding current does not determine completely the heating of the workpieces. When the butts of the workpieces are heated, the automatic increase in the speed of the workpiece motion leads only to increasing of the intensity of flashing and additional loss of metal, but not to the increasing of the heating effect on the workpiece butts.

These and other objects are attained in a novel process of flash-butt welding, which includes the steps of imparting to the workpieces to be welded continuous motion, one toward the other, imparting to the workpieces additional reciprocating motion, bringing the workpieces into contact by way of the butt ends thereof, and passing welding current therethrough.

In accordance with the invention, during each period of additional reciprocating movements, the pulse length is measured and compared with a preset value, and, should there be any deviation of the actual value from a preset one, the speed of displacement of the workpieces being welded is accordingly adjusted.

The present invention is based on the fact found by the inventors that, as the temperature of the butt ends of the workpieces being welded rises, the welding-current pulses decrease in length, and that there is a proportional relationship between the welding-current pulse length, on the one hand, and the speed of continuous displacement of the workpieces being welded, one toward the other, as well as the amplitude of additional reciprocating movements of the workpieces being welded, on the other.

Application of the present invention provides for a constant amount of energy supplied to the workpieces with each pulse, thereby ensuring stability of heating of the workpieces being welded and, hence, high quality of the welded joints, and also permits reducing the welding time and the flashing allowance.

The welding-current pulse energy can be varied either through varying the speed of continuous displacement of the workpieces being welded, or else through varying the amplitude of additional reciprocating movements of the workpieces, and, should the welding-current pulse length exceed or fall below a preset value, the speed of continuous displacement or the amplitude of reciprocating motion of the workpieces is respectively decreased or increased.

The invention also provides a device, comprising a mechanism for continuously displacing the workpieces being welded one toward the other, a mechanism for imparting reciprocating motion to the workpieces being welded, and a welding transformer to impart the required heat to the workpieces being welded.

In accordance with the invention, the device incorporates a mechanism with a controlled drive for continuously displacing the workpieces being welded, as well as means for controlling the speed of the drive, that means being formed by a current transformer included in the primary circuit of the welding transformer, with a pulse shaper coupled at the output of the current transformer, the pulse shaper forming pulses proportional in length to the pulses in the current transformer circuit as well as by a welding-current pulse-length setter coupled, together with the pulse shaper output, to a comparator whereof the output is coupled to the control circuit of the controlled drive of the mechanism for continuously displacing the workpieces being welded. This arrangement varies the speed of continuous displacement of the workpieces being welded one toward the other in compliance with the error signal furnished by the comparator in such a way that, should the welding-current pulse length fall below or exceed a preset value, the speed of continuous displacement is respectively increased or decreased.

The inventive device enables the method to be realized by use of existing equipment with minor design modifications, by a combination of mechanical and electronic components.

The welding-current pulse-length setter may be a source of constant voltage, in combination with means for converting the pulse-time signals of the pulse shaper to constant-voltage pulse-amplitude signals. The converting means is made up of two integrators, whereof the inputs are coupled, via a controlled multichannel switching means, to the pulse shaper, while the outputs of the integrators are coupled to the comparator for alternately coupling the integrators to the pulse shaper and to the comparator, with the result that the comparator receives pulse-amplitude signals proportional in magnitude to the welding-current pulse length.

Each integrator preferably incorporates an output-signal reset circuit and a differentiating circuit whereof the input is coupled to the output of the pulse shaper and the output is coupled, via the controlled switching means, to the reset circuit.

The switching means is preferably so designed that with one of the integrators coupled to the comparator, the differentiating circuit gets coupled to the reset circuit of the other integrator The switching-means control circuit preferably incorporates a flip-flop coupled, via the differentiating circuit, to the output of the pulse shaper and responding to each output signal of the pulse shaper by generating a signal to switch over the switching means from one position to the other.

The invention will be better understood and its advantages more fully appreciated from the following descriptions of two exemplary embodiments of a device for controlling the process of flash-butt welding, taken in conjunction with the accompanying drawings, wherein:

FIG. 3 is a schematic representation of a signal in the welding transformer circuit;

FIGS. 4a and 4b illustrate the shape of the pulse-shaper output;

FIGS. 7a and 7b illustrate signals at the inputs of the integrators;

FIGS. 8a and 8b represent signals at the outputs of the integrators;

FIG. 9 illustrates a differentiated signal according to FIG. 4b;

FIG. 10 is a diagram illustrating the operation of a flip-flop; and

FIG. 11 illustrates a signal at the input of a comparator.

Figure 1:
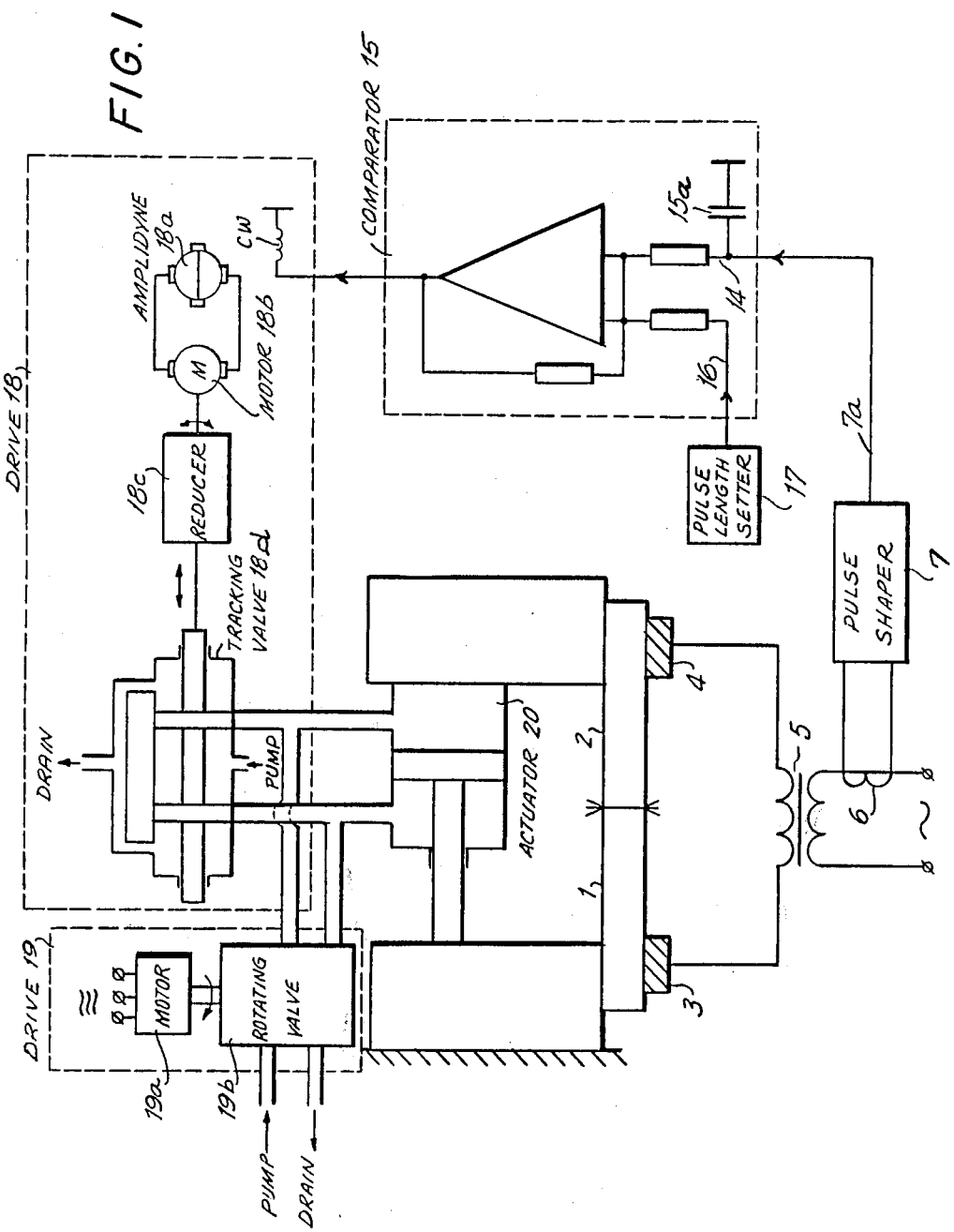
FIG. 1 is a partly schematic block and circuit diagram of a first, basic embodiment of the inventive device.

Referring now to the drawings, a device for flash-butt welding is illustrated therein (FIG. 1), wherein workpieces 1, 2 to be welded are secured in dies 3, 4.

Figure 2:
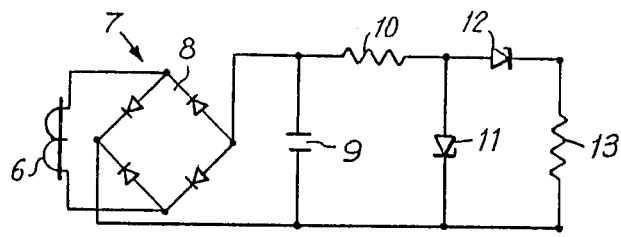
FIG. 2 is a diagram of the pulse shaper.

The die 3 is rigidly coupled with a stationary column whereas the die 4 is rigidly coupled with a movable column. Supply voltage is fed to the dies 3 and 4 via a welding transformer 5. The primary circuit of the welding transformer 5 includes a circuit transformer 6, the output thereof being coupled to a pulse shaper 7 illustrated in one of the possible embodiments thereof in FIG. 2.

The pulse shaper comprises a rectifier 8, a filter 9, an upper signal-level limiter formed by a resistor 10 and a diode 11 a lower signal-level limiter formed as a diode 12, and a resistor 13 serving as an output of the pulse shaper 7. The output 7a of the pulse shaper 7 is coupled to an input 14 of a comparator 15 whereof a second input 16 is coupled to a welding-current pulse-length setter 17.

The comparator 15 comprises a standard operational amplifier having two inputs 14, 16. The setter 17 is an adjustable source of constant voltage.

The device also incorporates a drive 18 of a mechanism for continuously displacing the workpieces 1 and 2 one toward the other and a drive 19 of a mechanism for imparting to the workpieces at least periodical additional reciprocating motion. The drive 18 includes an amplidyne 18a, a direct-current motor 18b, a gear reducer 18c and a hydraulic tracking valve 18d. The drive 19 comprises an AC motor 19a and a rotating hydraulic valve 19b. Both these devices are coupled, by way of the outputs thereof, to an actuator 20 which may be a hydraulic power cylinder rigidly linked with the columns of the welding machine.

In FIG. 1, the output of the comparator 15 is coupled to the input of the earlier-described drive 18. In a possible alternative embodiment, the output of the comparator 15 is coupled to the input of the drive 19, providing for the additional reciprocating movements of the workpieces 1 and 2.

The device of this invention operates as follows. The workpieces 1 and 2 to be welded are secured in the dies 3 and 4 of the device and voltage is supplied thereto via the welding transformer 5. The drive 18 of the mechanism for continuously displacing the workpieces and the drive 19 of the mechanism for imparting additional reciprocating motion to the workpieces are switched on. As a result, the workpiece 2 is continuously displaced toward the workpiece 1, executing additional reciprocating movements in the direction of continuous displacement.

From a certain point in time the workpieces 1 and 2 are brought into contact by way of the butt ends thereof, and current starts to flow through the welding circuit, which current is characterized in that it is in the form of current pulses (when additional reciprocating motions are combined with continuous displacement), with further attenuation thereof to a possible break down of the welding circuits (when the additional reciprocating motions are subtracted from the continuous displacement). The recurrence frequency of the current pulses is equal to the frequency of reciprocating motions.

In the course of flashing, a signal $V_1$ (FIG. 3), which represents the welding current to a certain scale, is taken off the transformer 6 and delivered to the pulse shaper 7, to be converted to a rectangular pulse $V_2$ (FIG. 4a). These rectangular pulses are equal in length to the welding-current pulses, and the amplitudes of all the pulses are equal and invariable.

Further, the rectangular pulses $V_2$ are fed to the input 14 of the comparator 15, wherein their length is transformed, by the help of an input capacitor 15a, to a corresponding level of constant voltage, and compared with that of the signal furnished by the setter 17.

The output signal of the comparator 15 is an error signal which is fed to a control winding CW of the amplidyne 18a in the drive 18 of the mechanism for continuously displacing the work-pieces, which drives the actuator 20 to vary the speed of continuous displacement of the workpieces 1 and 2 one toward the other. This eliminates any mismatch between the actual welding-current pulse length and the present value; and, should the actual pulse length exceed the preset one, the speed of continuous displacement is reduced, and vice versa.

As a result, the welding-current pulse energy is stabilized, causing the heating of the workpieces to be stabilized, thereby providing for a higher quality of the welded joints, shorter heating times and, consequently, higher welding rates, as well as smaller flashing allowances.

However, the above-described pattern of control of the flash-butt welding process has a disadvantage. In order to transduce the rectangular pulses $V_2$ to correspond to the level of constant voltage, it is necessary to use a low-frequency filter, such as the capacitor 15a, in the input circuit 14 of the comparator 15. In this case, the quick operation of the control system becomes impaired, and consequently the precision of control also becomes lower.

We are now coming to the block diagram and key diagram of FIGS. 5 and 6, respectively, of the alternative, preferred embodiment, which will be described hereinafter. The workpieces 1, 2 to be welded are secured in the dies 3, 4 of the welding machine, the die 3 being rigidly coupled to the stationary column of the machine, while the die 4 is rigidly coupled with the movable column thereof. Supply voltage is fed to the dies 3, 4 via the welding transformer 5. The primary circuit of the transformer 5 includes the current transformer 6 of which the output is coupled to the pulse shaper 7. The latter is distinct from that of FIG. 2 only in that a relay with a winding 21 and a contact assembly 22, 7a and 7b is substituted for the earlier-described resistor 13. The transfer contact 22 of the relay is coupled to the negative pole of a stabilized DC source, whereas the contacts 7a, 7b serve as the outputs of the pulse shaper 7.

Figure 5:
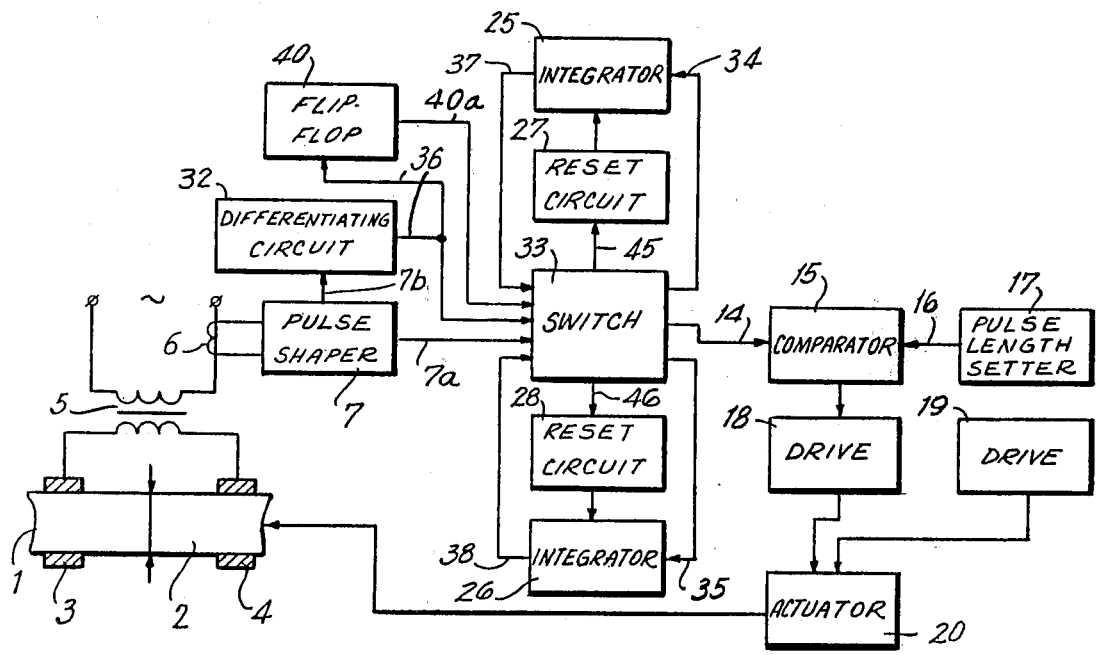
FIG. 5 is a block diagram of a preferred embodiment of the inventive device.
Figure 6:
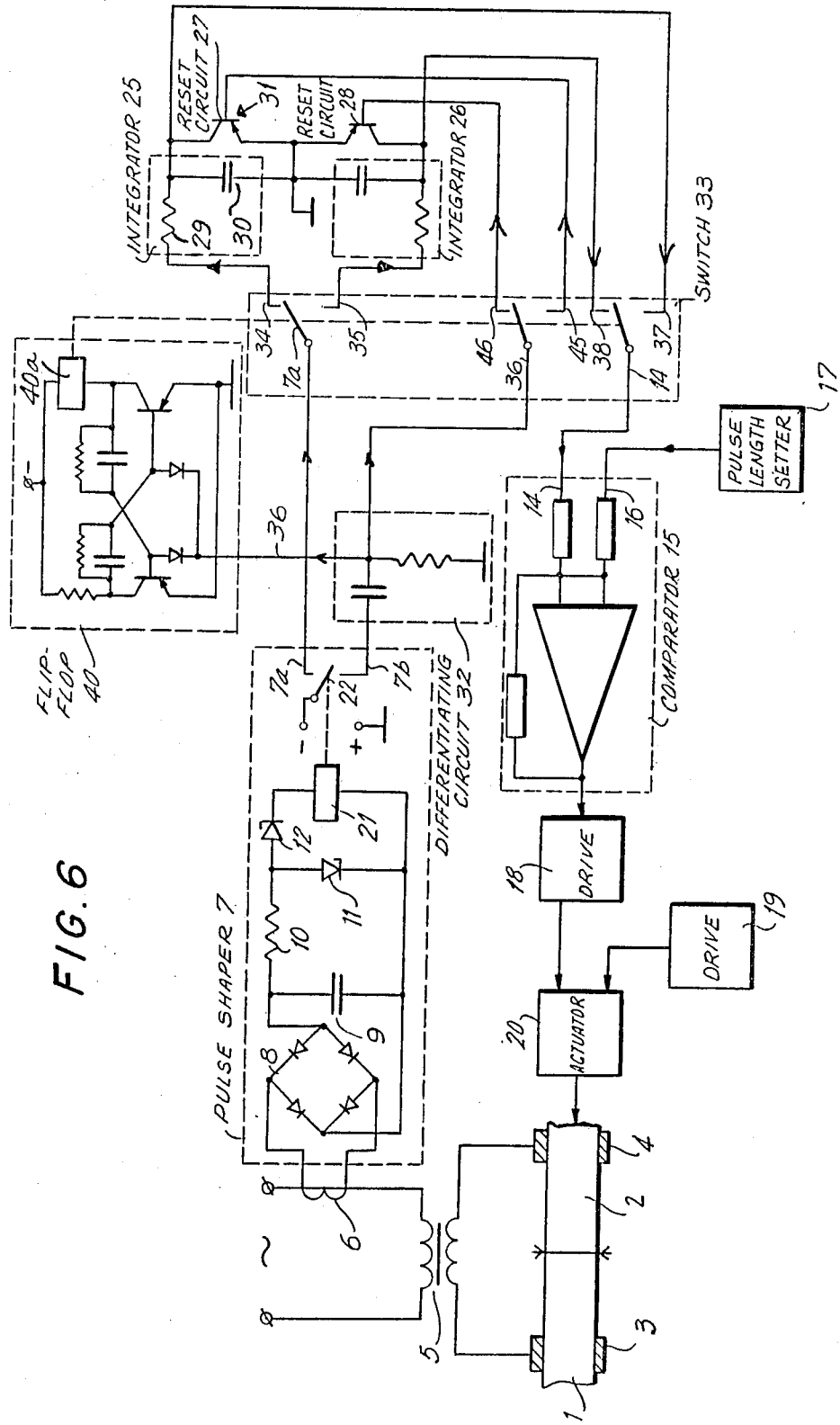
FIG. 6 is a detailed key diagram of the preferred embodiment of FIG. 5.

The device of FIGS. 5, 6 also incorporates two integrators 25 and 26, each of which include reset circuits 27, 28. The integrator of FIG. 6 may be built around a resistor 29 and a capacitor 30, while the reset circuit may be built around a transistor 31. The transistor 31, having a high resistance, is blocked most of the time; it is rendered conducting for very brief time intervals, and then its resistance drops many times.

The device comprises a differentiating RC circuit 32 of which the input is coupled to the output 7b of the pulse shaper and a flip-flop 40 with a relay coil 40a in the collector circuit of a transistor.

The input of the flip-flop 40 is coupled to an output 36 of the differentiating circuit 32, whereas an output of the same flip-flop 40 is coupled to a controlled multichannel switching means or switch 33, formed by three groups of contacts of the relay 40a.

The switching means 33 sets the sequence in which respective inputs 34, 35 of the integrators 25, 26 are selectively, internally coupled to the output 7a of the shaper 7, the reset circuits 27 and 28 to the output 36 of the circuit 32, and outputs 37, 38 of the integrators 25, 26 to the input 14 of the comparator 15.

The first group of contacts of the switching means 33 is coupled to the output 7a of the shaper 7 and to the input 34 of the integrator 25 as well as to the input 35 of the integrator 26.

The second group of contacts of the switch 33 is coupled to the output 36 of the differentiating circuit 32, to an input of the reset circuit 27 and to an input 46 of the reset circuit.

The third group of contacts of the switching means 33 is coupled to the input 14 of the comparator 15, to the output 37 of the integrator 25 and to the output 38 of the integrator 26.

The second input 16 (FIG. 5) of the comparator 15 is coupled to the pulse-length setter 17, formed as a source of constant voltage.

The output of the comparator 15 is coupled to the input of the above-described drive 18 of the mechanism for continuously displacing the workpieces, the output thereof being coupled to an input of the earlier-described actuator 20. An input of the actuator 20 is likewise coupled to the drive 19 of the mechanism for effecting additional reciprocating movements.

A device can be envisaged wherein the output of the comparator is coupled to the input of the drive 19 of the mechanism for effecting additional reciprocating movements, rather than to the drive 18 of the mechanism for continuously displacing the workpieces being welded.

The preferred device of FIGS. 5, 6 operates as follows.

As soon as flashing starts (the mechanism of flashing has been described in detail in the earlier example), the signal $V_1$, schematicaly represented in FIG. 3, is taken off the current transformer 6. This signal is converted by the pulse shaper 7 the signal $V_2$ (FIG. 4a) made up of square pulses and pauses, the pulse length of the signal $V_2$ being equal to the welding-current pulse length. Further, these pulses are alternately fed, via the contact 7a of the switching means 33, to the integrators 25, 26 so that odd pulses $V_3$ (1, 3, 5, etc.) are fed to the input 34 of the integrator 25 (FIG. 7a), whereas even pulses $V_4$ (2, 4, 6, etc.) are delivered to the input 35 of the integrator 26 (FIG. 7b). Each of these pulses is integrated, and the resultant level is stored (signals $V_5$ and $V_6$ of FIG. 8a and 8b).

Besides, an output signal $V_7$ (FIG. 4b), out of phase with the signal $V_2$ (FIG. 4a), is delivered from the output 7b of the pulse shaper 7 to the input of the differentiating circuit 32. The pulses $V_7$ are differentiated by the circuit 32, whereof the output 36 produces short negative pulses $V_8$ (FIG. 9) at the instants of termination of the welding current pulses.

Via the second group of contacts 36, 45, 46 of the switching means 33, these pulses are delivered to the inputs of the reset circuits 27, 28 of the integrators 25, 26, resetting their output signals. The pulses $V_8$ are fed to the input 45 of the reset circuit 27 of the integrator 25 at the instants of termination of the pulses $V_4$ which are fed to the input 35 of the integrator 26, whereas the pulses $V_8$ are fed to the input 46 of the reset circuit 28 of the integrator 26 at the instants of termination of the pulses $V_3$ delivered to the input 34 of the integrator 25.

The short negative pulses $V_8$ are likewise fed to the input of the flip-flop 40, switching it over (signal $V_9$ of FIG. 10). As the flip-flop 40 is being switched over, the transfer contacts of the switching means 33 are reset from one position to the other.

As a result, signals $V_5$, $V_6$ appear at the outputs 37, 38 of the integrators 25, 26 (FIG. 8). Further, these signals pass through the third group of contacts 37, 38, 14 of the switch 33 to the input 14 of the comparator 15. A signal $V_{10}$ appears at the input 14 of the comparator 15 (FIG. 11), the amplitude of the signal being in proportion with the duration of each welding-current pulse passing therethrough.

Thus, the integrators 25, 26 together with the switching means 33 define a means for converting the pulse-time signals furnished by the pulse shaper to pulse-amplitude signals.

Lest the levels of the signals $V_5$, $V_6$ generated at the outputs 37, 38 of the integrators 25, 26 should vary during the storage time the input 14 of the comparator 15 has a sufficiently high resistance.

In the comparator 15, the signal $V_{10}$ is compared with a constant voltage $V_{11}$ of the setter 17, and, should there be a deviation this or that way, a command signal is delivered to the drive 18 of the mechanism for continuously displacing the workpieces. This command signal varies the speed of displacement of the workpieces, one toward the other, by a value required to eliminate the deviation; and should the measured welding-circuit pulse length be greater than the preset value the speed of displacement is reduced, and vice versa.

As a result, the welding-current pulse energy is stabilized, also stabilizing the heating of the workpieces being welded, which provides for a higher quality of the welded joint for shorter welding times and for smaller flashing allowances.

What we claim is:

1. A device for controlling the process of flash-butt welding, comprising: a mechanism for continuously displacing the workpieces to be welded, one toward the other, with a controlled actuator; a mechanism for effecting additional reciprocating motion of the workpieces along the direction of the continuous motion, resulting in intermittent contact between the workpieces; a welding transformer for applying a voltage to the workpieces; means for controlling the speed of said actuator, including a current transformer fitted into the primary circuit of said welding transformer; a pulse-signal shaper coupled to the output of said current transformer and arranged to deliver pulses resulting from the intermittent workpiece contact, and the duration of which pulses is proportional to the pulses in the circuit of said current transformer said shaper having an output that delivers time-pulse signals; a converter fitted to the output of said pulse shaper for converting the time-pulse signals into amplitude-pulse signals at the output of said converter the amplitude of which is proportional to the duration of the output pulse of the pulse shaper; a welding-current pulse-duration setting means; and a comparator connected to said setting means and to said output of the converter; wherein the output of said comparator is fed to said actuator in said displacing mechanism in order to adjust the speed of the displacement in function of a misalignment signal delivered by said comparator, so that, when the welding-current pulse-duration changes, as compared with a preset value, the speed of the displacement is correspondingly changed.

2. The device as defined in claim 1, wherein said setting means is a DC voltage source, while said converter is in the form of two integrators, the inputs of which are connected through a controlled multi-channel switching circuit to said pulse shaper, while their outputs are fed to said comparator for alternatingly switching said integrators to said shaper and to said comparator; thus resulting in that the amplitude-pulse signals arrive at said comparator, the magnitude of which signals is proportional to the welding-current pulse duration.

3. The device as defined in claim 2, wherein said integrators are provided with output-signal reset circuits; and further comprising at least one differentiating circuit, the input of the latter being coupled to said output of the pulse shaper, and said output is selectively coupled, via said switching circuit, to one of said reset circuits; said switching circuit being so wired that, when one of said integrators is coupled to said comparator, said differentiating circuit is coupled to said reset circuit of the other integrator.

4. The device as defined in claim 3, wherein said switching circuit includes a control circuit incorporating a flip-flop coupled via said differentiating circuit to said output of the pulse shaper and responding to the output signals of the latter with a signal to switch over said switching circuit from one position to another.

* * * * *